Aug. 10, 1954    J. A. LAMPMAN ET AL    2,685,813
PREFABRICATED GLASS FIBER RIVET BODY
Filed Sept. 18, 1951

INVENTORS:
James A. Lampman
Harold E. Remillard
By Herbert E. Metcalf
Their Patent Attorney

Patented Aug. 10, 1954

2,685,813

UNITED STATES PATENT OFFICE 2,685,813

PREFABRICATED GLASS FIBER RIVET BODY

James A. Lampman, Inglewood, and Harold E. Remillard, Anaheim, Calif., assignors to Northrop Aircraft, Inc., Hawthorne, Calif., a corporation of California Application September 18, 1951, Serial No. 247,172

4 Claims. (Cl. 87—1)

Our present invention relates to glass fiber rivets and more particularly to improvements of the invention described, shown, and claimed in our copending application Serial No. 233,368, filed June 25, 1951, and now abandoned, wherein we teach a means and method of riveting material such as plastic impregnated glass fabric sheets together with plasticized glass fiber rivets. In this manner radomes, for example, can be fabricated of such materials, with riveted joints therein so that the transmission of radio or radar frequency waves through the radome wall is substantially uniform throughout.

It is one of the objects of our present invention to provide a glass fiber rivet body which can be mass produced, packaged, and stored if necessary, for future use.

Another object of our invention is to provide a glass fiber rivet body of uniform diameter and smooth contour, which is easily inserted into bores of somewhat the same diameter without having unraveled strands of the glass fiber catching or piling up at the bore openings when being inserted therein.

Briefly, our present invention, in one preferred form, comprises a plurality of plasticized glass fiber threads of uniform length, grouped together to form a generally cylindrical bundle body of uniform diameter, and incased from one end to the other in a tight sleeve of a thermoplastic material for example, the rivet body being adapted to be upset by heat and pressure to provide a solid headed rivet.

This invention will be more easily understood by referring to the drawings wherein.

Figure 1:
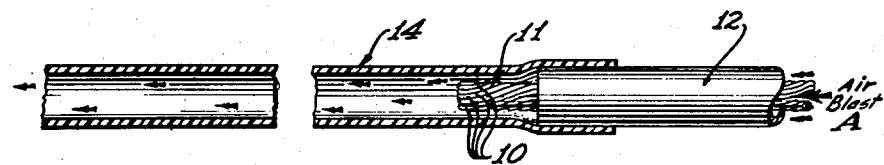
Figure 1 is a diagrammatic view in longitudinal section, showing a bundle of glass fiber threads being inserted into a plastic sleeve, using the pressure of an air blast to distend the sleeve.
Figure 2:
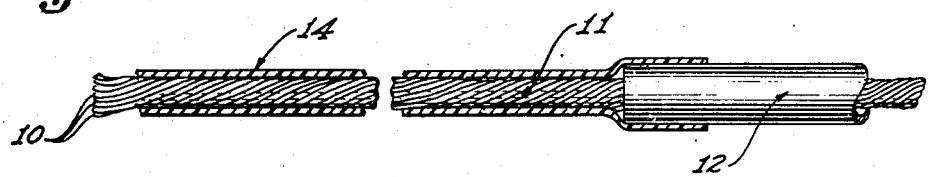
Figure 2 is a diagrammatic view in longitudinal section in which the glass fiber threads have been extended through the length of the sleeve, and the air blast discontinued.
Figure 3:
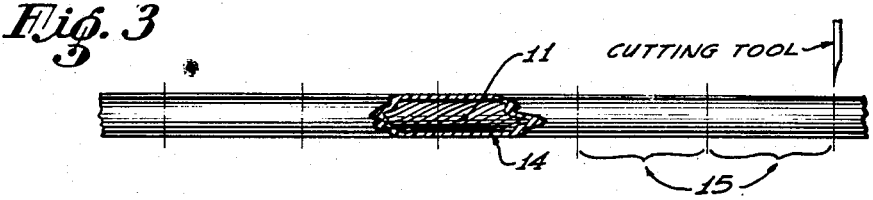
Figure 3 is a side elevational view of a length of rivet body; the sleeve being cut away to show the incased glass fiber threads.

Referring first to Figure 1, a number of glass fiber threads 10, of approximately the same length, are grouped together into a generally cylindrical elongated body 11 with the threads 10 running lengthwise along the axis thereof. The body 11 is impregnated with a "wet," i. e., partially cured plastic to hold the threads in place. In most cases it will be desirable to twist the body 11 so that the threads 10 spiral along the axis thereof, as in a cable for example. In one preferred method of encasing the body 11 as shown in Figures 1, 2, and 3, the body 11 of glass fiber threads 10 is fed into one end of a rigid tube 12 having a slightly greater diameter than the body 11. At the other end of the rigid tube 12, a thin walled sleeve 14 of a thermoplastic material, such as found in the vinyl or acetate groups, for example, and preferably cured, has one end thereof stretched over the opening of the rigid tube 12. The inside diameter of the plastic sleeve 14 should be slightly less than the outside diameter of the body 11 of glass fiber threads 10 in the twisted form as mentioned above. A blast of compressed air or gas "A" is then applied around the bundle 11 at the feed end of the rigid tube 12 as shown, to distend the plastic tube 14 while the body 11 of glass fiber threads is extended therethrough. When the plastic tube 14 is filled, from one end to the other, or to any given length, with the glass fibers 10, the air blast "A" is discontinued, as shown in Figure 2, and the plastic sleeve 14 exerts force in returning toward its original diameter, which was slightly smaller than the diameter of the body 11 of twisted glass fibers 10, and tightly incases the glass fiber body 11 therein. Rivets 15 of any desired length can then be cut as shown in Figure 3.

Figure 4:
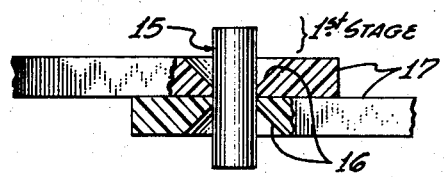
Figure 4 is a side elevational view, partly sectionalized to show the rivet body of Figure 3 cut to size and inserted in the aligned bores of a pair of plastic sheets to be riveted.
Figure 5:
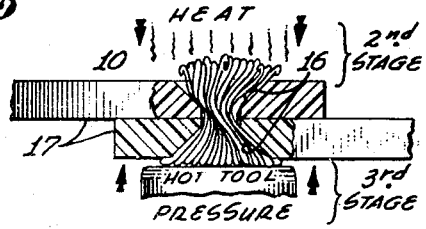
Figure 5 is a side elevational view, partly sectionalized to show the rivet being upset and cured in the aligned bores of Figure 4.
Figure 6:
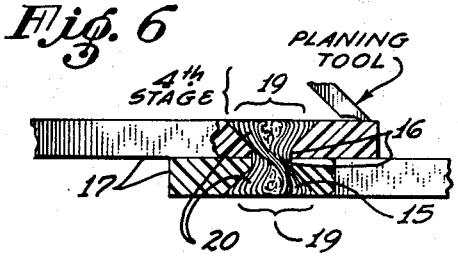
Figure 6 is a side elevational view, partly sectionalized to show the completed rivet.

It can thus be seen that the finished glass fiber rivet body 15 has a uniform diameter and smooth surface and can be inserted into the aligned countersunk bores 16 of a pair of plastic sheets 17 to be fastened together, as shown in Figures 4, 5 and 6 wherein the rivet body 15 is subsequently subjected to heat and pressure, to laterally crush outwardly the ends of the glass fiber threads 10 to form the heads 19 in the countersunk portions 20 of the bores 16, and cured. The heads 19 of the rivet 15 are then made flush with the surfaces of the sheets 17 and a high shear strength joint of electrical uniformity is thus formed.

Figure 7:
Figure 7 is a side elevational view of the present invention in another form wherein the sleeve is of a loosely braided construction.
Figure 8:
Figure 8 is a side elevational view of the sleeve of Figure 7 tightened around the glass fiber threads.

In Figure 7, another form of casing for the glass fiber threads is shown, wherein a sleeve 21 is loosely braided from strips 22 of cured thermoplastic material or impregnated glass fiber. The sleeve 21 is purposely retained in the loosely braided form so that the diameter will accommodate easy extension of the grouped glass fiber threads 10 therethrough. The ends of the sleeve 21 are then pulled strongly in opposite directions which evenly tightens the braided sleeve 21 around the glass fibers 10 as shown in Figure 8. The rivet body thus formed can then be saturated with uncured plastic binder and partially set to prevent the woven sleeve from unraveling at the ends.

It is at once apparent from the foregoing description, that there is provided a glass fiber rivet body which can be uniformly made in standard diameters, having a smooth surface for easy insertion into bores, and which can be mass produced and stored for future use.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modification within the legitimate and valid scope of the appended claims.

What is claimed is:

1. A prefabricated glass fiber rivet body of uniform diameter and smooth surface, comprising a plurality of glass fiber threads grouped together to extend longitudinally, in an elongated body, and said body being impregnated with a partially cured plastic binder, and a thermoplastic sleeve, said glass fiber threads being extended through said sleeve and tightly pressed together by said sleeve, said rivet body being adapted to be upset by heat and pressure to provide a solid headed rivet.

2. A prefabricated glass fiber rivet body of uniform diameter and smooth surface, comprising a plurality of glass fiber threads longitudinally twisted around each other to form a cylindrical body, and impregnated with a partially set plastic material and a thermoplastic sleeve compressing said body, said rivet body being adapted to be upset by heat and pressure to provide a solid headed rivet.

3. A rivet body in accordance with claim 1 wherein said sleeve is braided of strips of a cured thermoplastic material, said sleeve then being impregnated with partially cured plastic to hold said strips tightly around said fiber threads.

4. A rivet body in accordance with claim 1 wherein said sleeve is braided of glass fiber yarn.

References Cited in the file of this patent

UNITED STATES PATENTS

| Number | Name | Date |
|---|---|---|
| 2,184,899 | Shand | Dec. 26, 1939 |
| 2,284,728 | Dreyfus | June 2, 1942 |
| 2,311,704 | Simison | Feb. 23, 1943 |
| 2,327,104 | Gudebrod | Aug. 17, 1943 |
| 2,344,181 | Stone | Mar. 14, 1944 |
| 2,500,332 | Whitehead | Mar. 14, 1950 |